United States Patent
Choi et al.

(10) Patent No.: US 9,462,551 B2
(45) Date of Patent: Oct. 4, 2016

(54) CENTRAL CONTROL APPARATUS AND METHOD FOR ENERGY EFFICIENCY OF A BASE STATION IN A MOBILE COMMUNICATION SYSTEM

(71) Applicant: Samsung Electronics Co., Ltd., Suwon-si (KR)

(72) Inventors: Jin Hyeock Choi, Yongin-si (KR); Byung Chang Kang, Yongin-si (KR); Jong Ho Bang, Yongin-si (KR); Byung Moo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 14/199,316

(22) Filed: Mar. 6, 2014

(65) Prior Publication Data
US 2014/0185509 A1    Jul. 3, 2014

Related U.S. Application Data

(63) Continuation of application No. PCT/KR2012/007188, filed on Sep. 6, 2012.

(30) Foreign Application Priority Data

Sep. 6, 2011 (KR) .................. 10-2011-0089969

(51) Int. Cl.
*H04W 24/00* (2009.01)
*H04W 52/02* (2009.01)
(Continued)

(52) U.S. Cl.
CPC ......... *H04W 52/0232* (2013.01); *H04W 24/00* (2013.01); *H04W 52/0206* (2013.01); *H04W 16/26* (2013.01); *H04W 40/12* (2013.01); *H04W 72/1231* (2013.01); *Y02B 60/50* (2013.01)

(58) Field of Classification Search
CPC ... H04W 16/26; H04W 24/00; H04W 28/08; H04W 40/12; H04W 72/1231; H04W 88/08; H04L 12/4625; H04L 1/0003
See application file for complete search history.

(56) References Cited

U.S. PATENT DOCUMENTS 5,771,454 A     6/1998 Ohsawa
2007/0280192 A1* 12/2007 Yagyu ................ H04L 12/4625
                                                    370/349

(Continued)

FOREIGN PATENT DOCUMENTS

JP     2007-49700 A    2/2007
JP     2011-24213 A    2/2011

(Continued)

OTHER PUBLICATIONS

International Search Report Issued Feb. 27, 2013 in parent International Application No. PCT/KR2012/007188. (5 pages, in Korean, with English language translation).

(Continued)

*Primary Examiner* — Raj Jain
(74) *Attorney, Agent, or Firm* — NSIP Law

(57) ABSTRACT

A central control apparatus and method thereof include a traffic demand receiving unit, a traffic demand calculating unit, a base station efficiency calculating unit, and a base station management unit. The traffic demand receiving unit is configured to receive a required traffic demand and a current location of each of terminals. The traffic demand calculating unit is configured to calculate traffic of each of base stations to which a terminal is unassigned. The base station efficiency calculating unit is configured to calculate an energy efficiency of each of the base stations. The base station management unit configured to verify a base station with an optimum energy efficiency, to activate the base station with the optimum energy efficiency, and to assign the terminals of a corresponding region to the base station with the optimum energy efficiency.

19 Claims, 4 Drawing Sheets

(51) Int. Cl.
*H04W 40/12* (2009.01)
*H04W 16/26* (2009.01)
*H04W 72/12* (2009.01)

(56) References Cited

U.S. PATENT DOCUMENTS

| | | | |
|---|---|---|---|
| 2008/0032726 A1* | 2/2008 | Tajima | H04L 1/0003 455/509 |
| 2008/0204321 A1* | 8/2008 | Yanagihara | G01S 5/0284 342/450 |
| 2010/0130244 A1* | 5/2010 | Hong | H04W 72/1231 455/522 |
| 2011/0136534 A1 | 6/2011 | Nanba et al. | |
| 2012/0157002 A1* | 6/2012 | Choi | H04W 52/0206 455/67.11 |
| 2014/0185509 A1* | 7/2014 | Choi | H04W 52/0206 370/311 |

FOREIGN PATENT DOCUMENTS

| | | |
|---|---|---|
| JP | 2011-30236 A | 2/2011 |
| KR | 10-2004-0048274 A | 6/2004 |
| KR | 10-2005-0001685 A | 1/2005 |
| KR | 10-2005-0064716 A | 6/2005 |
| KR | 10-2006-0114648 A | 11/2006 |
| KR | 10-2008-0097782 A | 11/2008 |
| KR | 10-2008-0100185 A | 11/2008 |
| KR | 10-2009-0000955 A | 1/2009 |
| KR | 10-2009-0121342 A | 11/2009 |
| KR | 10-2010-0114109 A | 10/2010 |
| KR | 10-2010-0114112 A | 10/2010 |
| KR | 10-2010-0130231 A | 12/2010 |
| KR | 10-2010-0135053 A | 12/2010 |
| KR | 10-2011-0042508 A | 4/2011 |
| KR | 10-2011-0065996 A | 6/2011 |
| KR | 10-2011-0092950 A | 8/2011 |
| KR | 10-2011-0093054 A | 8/2011 |

OTHER PUBLICATIONS

Oh, Eunsung, et al.. "Energy savings through dynamic base station switching in cellular wireless access networks." Global Telecommunications Conference (GLOBECOME 2010), 2010 IEEE. IEEE, 2010.

Vadgama, Sunil, et al. "Trends in green wireless access networks." Communications Workshops (ICC), 2011 IEEE International Conference on. IEEE, 2011.

* cited by examiner

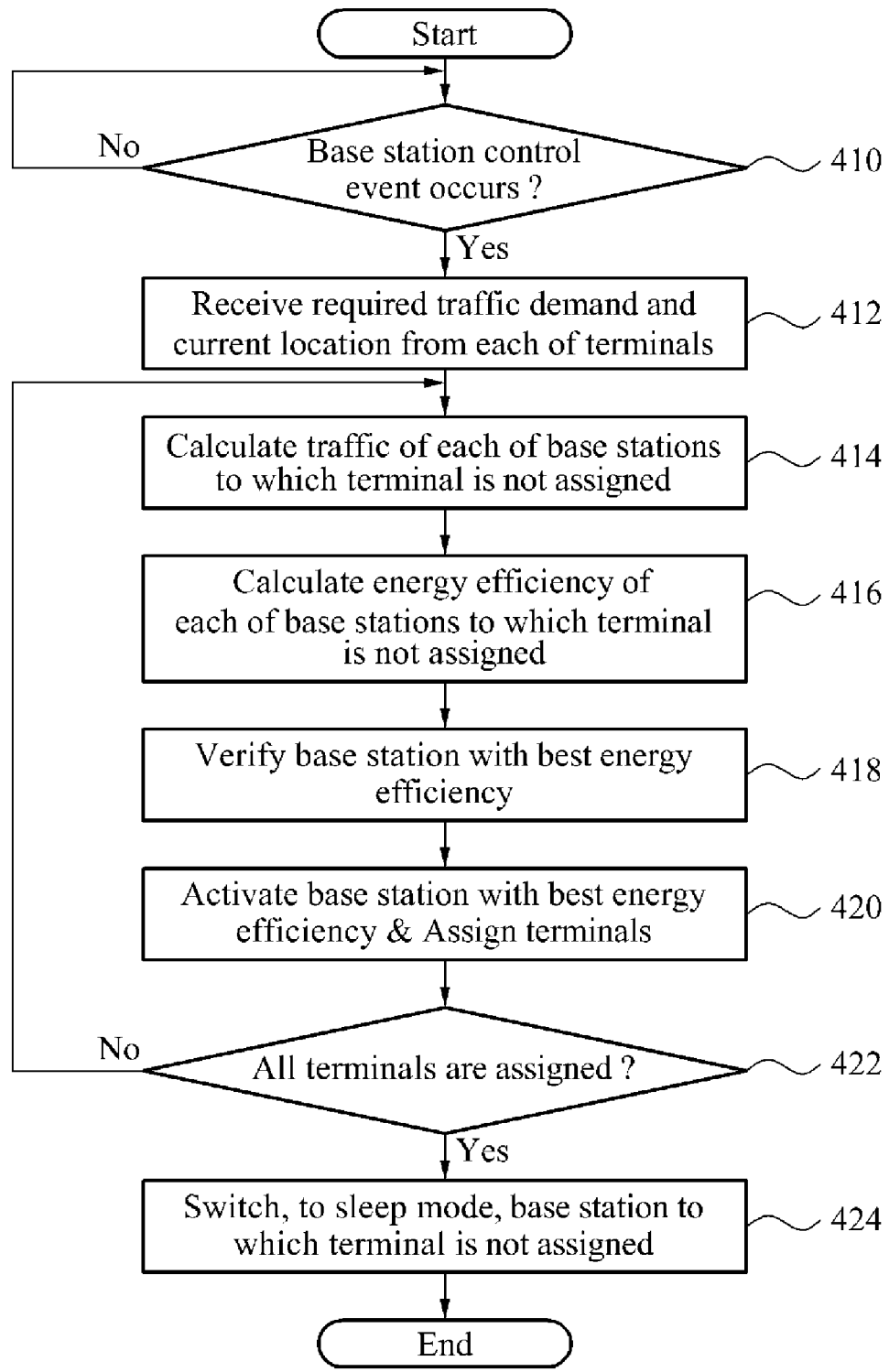

CENTRAL CONTROL APPARATUS AND METHOD FOR ENERGY EFFICIENCY OF A BASE STATION IN A MOBILE COMMUNICATION SYSTEM

CROSS-REFERENCE TO RELATED APPLICATION(S)

This application is a Bypass Continuation Application of PCT Application No. PCT/KR2012/007188, filed on Sep. 6, 2012, which claims priority under 35 U.S.C. §119(a) to Korean Patent Application No. 10-2011-0089969, filed on Sep. 6, 2011, in the Korean Intellectual Property Office, the entire disclosures of which is incorporated herein by reference.

BACKGROUND

1. Field

The following description relates to power saving in a mobile communication system, and more particularly, to reduction in power consumption based on an energy efficiency of a base station in a mobile communication system.

2. Description of Related Art

In a wireless communication system, a traffic load may change at regular time intervals, for example, every 24 hours or every 1 week. During a time slot in which a wireless communication system is frequently used, for example, during business hours, a relatively large amount of communication traffic may occur due to an increase in a number of users. Conversely, at night time, a relatively small amount of traffic may occur.

Typically, in a wireless communication system, a capacity of a base station may be set so that traffic during a time slot in which a largest amount of traffic occurs may be easily processed and, accordingly, a user may be provided with a seamless service during the time slot.

Additionally, in a conventional wireless communication system, a base station may perform basic operations to provide a normal service even during a time slot in which a relatively small amount of traffic occurs. The basic operations may include, for example, transmission of system information, transmission of a primary synchronization signal and a secondary synchronization signal, transmission of a reference signal, and other types of signals.

When the basic operations are performed, a considerable amount of power may be consumed in the base station. For example, when a base station is assumed to consume 100% of base power to process maximum traffic, about 52% of power in comparison with the base power may continue to be consumed to perform the basic operations in the base station.

The base station may inevitably continue to consume power by simply performing above basic operations, despite traffic not existing within a cell coverage of the base station. In particular, in a wireless communication system including layer cells, a plurality of lower base stations may be used and, accordingly, an amount of power to be consumed in base stations within a corresponding cell may further increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a central control apparatus, including a traffic demand receiving unit configured to receive a required traffic demand and a current location of each of terminals; a traffic demand calculating unit configured to calculate traffic of each of base stations to which a terminal is unassigned; a base station efficiency calculating unit configured to calculate an energy efficiency of each of the base stations; and a base station management unit configured to verify a base station with an optimum energy efficiency, to activate the base station with the optimum energy efficiency, and to assign the terminals of a corresponding region to the base station with the optimum energy efficiency.

The traffic demand calculating unit, the base station efficiency calculating unit, and the base station management unit may repeatedly receive, calculate the traffic, calculate the energy efficiency, and verify, respectively, until all terminals are assigned to a base station.

The base station management unit may switch to a sleep mode a base station to which the terminal is unassigned after all the terminals are assigned to the base station.

The traffic demand receiving unit may be configured to receive the required traffic demand and the current location through a separate low-power control channel that is communicable with the central control apparatus.

The traffic demand receiving unit may be configured to receive at a preset time, at a preset time interval, or at a point in time at which the central control apparatus requests each of the terminals to transmit the required traffic demand and the current location.

The traffic demand calculating unit may be configured to calculate by summing traffic demands of the terminals included in a region of each of the base stations within a traffic range provided by each of the base stations.

The traffic demand calculating unit may perform calculation, using the following Equation $$\sigma_i(s) = \min(\Sigma_{u_q \in W_i(s)} d_q(s), T_i^{max}),$$

where $\sigma_i(s)$ is traffic that is to be provided by a base station Bi at a time s, $W_i(s)$ is a set of terminals included in the base station Bi at the time s, $u_q$ is a terminal included in the set $W_i(s)$, $d_q(s)$ is a traffic demand required by the terminal $u_q$ at the time s, and $T_i^{max}$ is maximum traffic that is capable of being transmitted by the base station Bi.

The traffic demand calculating unit may calculate the traffic, except of an assigned terminal.

The energy efficiency is verified based on an amount of power required to transmit 1 bit, and wherein, as the amount of power required to transmit 1 bit decreases, the energy efficiency increases.

The base station efficiency calculating unit performs calculation, using the following equation $$\frac{P_i(\sigma_i(s))}{\sigma_i(s)},$$

where Pi( ) is a function used to calculate an amount of power to be consumed based on traffic in a base station Bi, and $\sigma_i(s)$ is traffic that is to be provided by the base station Bi at a time s.

In accordance with an illustrative configuration, there is provided a method of a central control apparatus, the method includes receiving a required traffic demand and a current location of each of terminals; calculating traffic of each of base stations to which a terminal is unassigned; calculating an energy efficiency of each of the base stations; verifying a base station with an optimum energy efficiency; activating the base station with the optimum energy efficiency; and assigning the terminals of a corresponding region to the base station with the optimum energy efficiency.

The method may also include repeatedly performing the calculating of the traffic, the calculating of the energy efficiency, the verifying, the activating and the assigning until all terminals are assigned to a base station.

The method may also include switching to a sleep mode a base station to which the terminal is unassigned after all the terminals are assigned to the base station.

The receiving may include receiving the required traffic demand and the current location through a separate low-power control channel that is communicable with the central control apparatus.

The receiving may include receiving at a preset time, at a preset time interval, or at a point in time at which the central control apparatus requests each of the terminals to transmit the required traffic demand and the current location.

The calculating may include summing traffic demands of the terminals included in a region of each of the base stations within a traffic range provided by each of the base stations.

The calculating of the traffic may include performing calculation, using the following Equation $$\sigma_i(s) = \min(\Sigma_{u_q \in W_i(s)} d_q(s), T_i^{max}),$$

where $\sigma_i(s)$ is traffic that is to be provided by a base station Bi at a time s, $W_i(s)$ is a set of terminals included in the base station Bi at the time s, $u_q$ is a terminal included in the set $W_i(s)$, $d_q(s)$ is a traffic demand required by the terminal $u_q$ at the time s, and $T_i^{max}$ is maximum traffic that is capable of being transmitted by the base station Bi.

The calculating of the traffic may include calculating traffic, except of an assigned terminal.

The energy efficiency may be verified based on an amount of power required to transmit 1 bit, and wherein, as the amount of power required to transmit 1 bit decreases, the energy efficiency increases.

The calculating of the energy efficiency may include performing calculation, using the following equation $$\frac{P_i(\sigma_i(s))}{\sigma_i(s)},$$

where Pi( ) is a function used to calculate an amount of power to be consumed based on traffic in a base station Bi, and $\sigma_i(s)$ is traffic that is to be provided by the base station Bi at a time s.

In accordance with an illustrative configuration, there is provided a non-transitory computer readable medium configured to control a processor to perform the method described above.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 4 is a flowchart illustrating a method to operate the communication network based on the energy efficiency of the base station in the central control apparatus, in accord with an embodiment.

Figure 1:
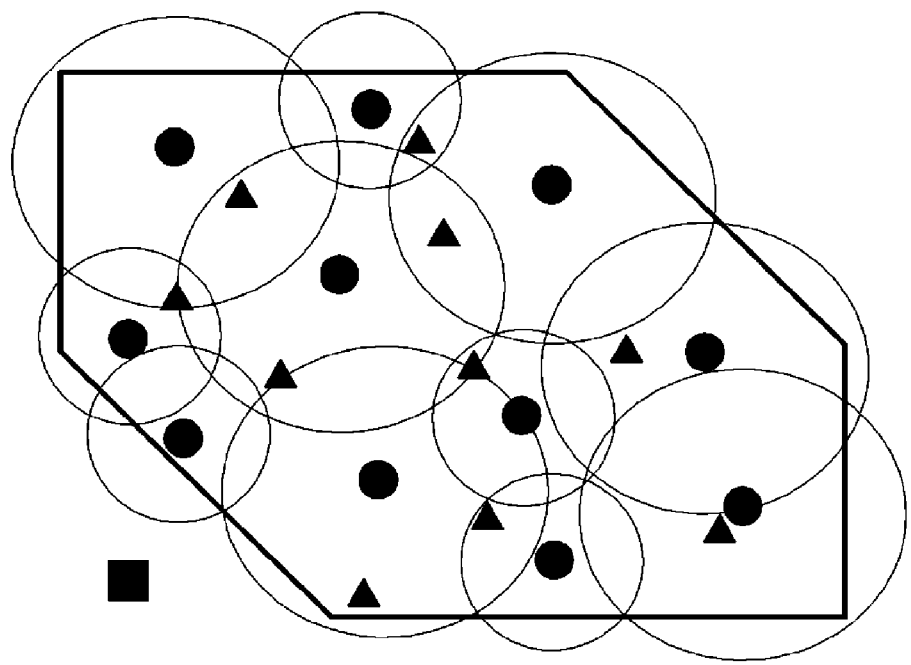
FIG. 1 is a diagram illustrating a schematic structure of a mobile communication system operating based on an energy efficiency of a base station, in accord with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A central control apparatus and method thereof are described, which operate based on an energy efficiency of a base station in a mobile communication system. The central control apparatus verifies a base station with an optimum or best energy efficiency, activates base stations, and assigns terminals in a descending order of energy efficiencies. The central control apparatus also switches to a sleep mode a base station to which a terminal is not assigned. Thus, the central control apparatus and method thereof are configured to reduce power by stopping an operation of an base station not needed during a low-traffic time slot.

That is, the central control apparatus calculates an energy efficiency of each base station, based on a power function of a base station and a traffic demand, and may first activate a base station with the optimum or best energy efficiency, based on the calculated energy efficiency. Thus, it is possible to reduce an amount of power to be consumed by a base station, while satisfying a quality of service (QoS).

FIG. 1 illustrates a schematic structure of a mobile communication system operating based on an energy efficiency of a base station, in accord with an embodiment.

Referring to FIG. 1, the mobile communication system includes base stations, terminals, and a central control apparatus.

The central control apparatus controls powering on/off of the base stations. An amount of power to be consumed at base stations may be determined based on a traffic amount.

The terminals receive a wireless service by accessing one of the base stations, and communicate with the central control apparatus via a separate low-power control channel.

The terminal transmits a required traffic demand and a current location of the terminal to the central control apparatus, through a low-power control channel, at a preset time, at a preset time interval, or at a point in time at which the central control apparatus requests the terminal to transmit the required traffic demand and the current location.

The central control apparatus monitors statuses of base stations, and statuses of terminals, through a low-power control channel. The central control apparatus controls the base stations and the terminals, if necessary. The central control apparatus verifies locations of all base stations within a given region, and verifies a cell region of each of the base stations.

Additionally, the central control apparatus verifies a required traffic demand and a current location of each of the terminals that are received from each of the terminals, and controls operation of each of the base stations based on a corresponding energy efficiency of each of the base station.

Figure 2:
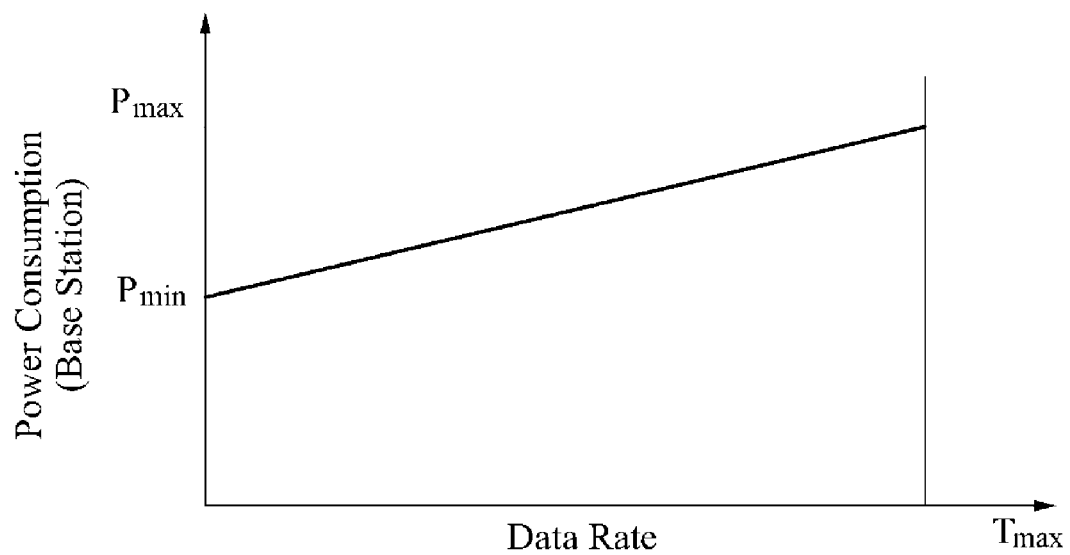
FIG. 2 is a graph illustrating power consumption of the base station based on a traffic amount, in accord with an embodiment.

FIG. 2 illustrates a graph of power consumption of a base station based on a traffic amount, in accord with an embodiment.

Referring to FIG. 2, an amount of power consumed by the base station increases as the amount of traffic approaches a maximum traffic threshold, $T_{max}$, of the base station.

As shown in the graph of FIG. 2, power continues to be consumed, even when there is no traffic at the base station. That is, the base station may use a constant power source during operation, despite traffic not occurring.

An amount of power consumed by a base station based on traffic may be determined based on a type of base stations, which may be expressed by a function Pi( ) for each base station.

Figure 3:
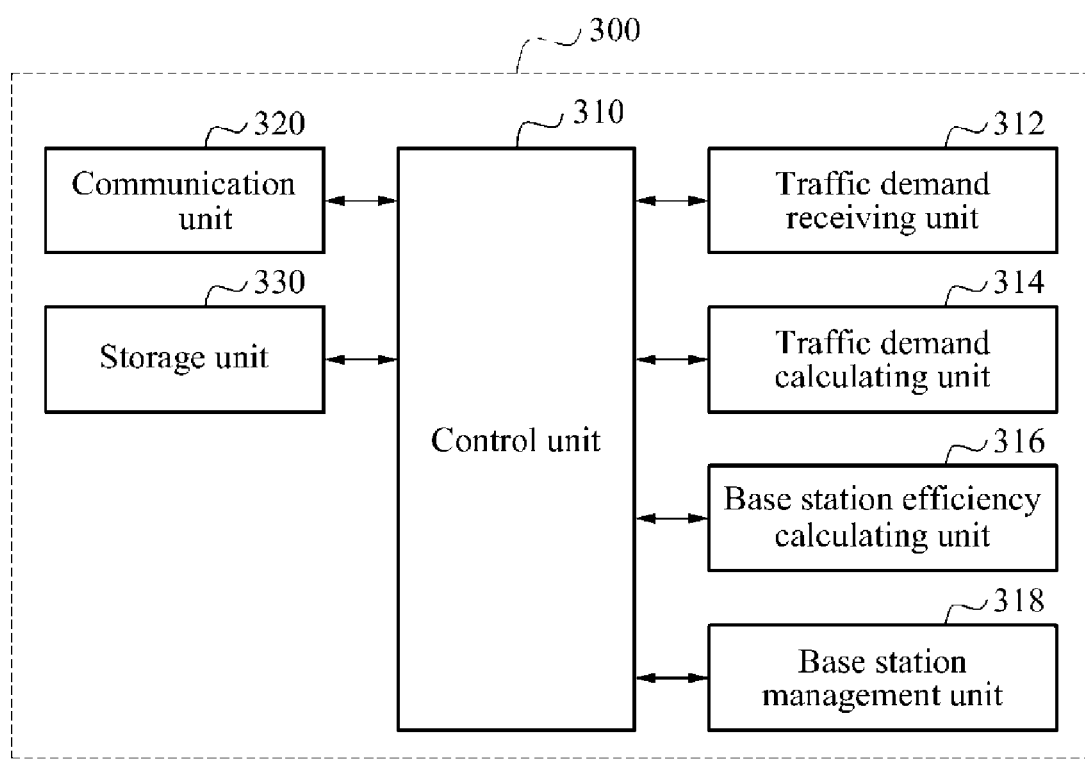
FIG. 3 is a block diagram illustrating a central control apparatus to operate a communication network based on an energy efficiency of the base station, in accord with an embodiment.

FIG. 3 illustrates an example of a central control apparatus operating a communication network based on an energy efficiency of a base station, in accord with an embodiment.

Referring to FIG. 3, a central control apparatus 300 includes a control unit 310, a communication unit 320, a storage unit 330, a traffic demand receiving unit 312, a traffic demand calculating unit 314, a base station efficiency calculating unit 316, and a base station management unit 318.

The communication unit 320 communicates with terminals through a separate low-power control channel, and transmits a control signal to base stations to control powering on/off.

The storage unit 330 stores an operating system (OS) and an application program to control an overall operation of the central control apparatus 300. Additionally, the storage unit 330 classifies and stores functions PQ of the base stations. The functions P( ) may be used to calculate an amount of power consumed based on a location of a base station, a cell region of the base station, and transmission traffic.

The traffic demand receiving unit 312 receives a required traffic demand and a current location of each of terminals from each of the terminals. The traffic demand receiving unit 312 also receives the required traffic demand and the current location through a separate low-power control channel, at a preset time, at a preset time interval, or at a point in time at which the central control apparatus 300 requests each of the terminals to transmit the required traffic demand and the current location. The separate low-power control channel may communicate with the central control apparatus 300.

The traffic demand calculating unit 314 calculates traffic at each of the base stations to which a terminal is not assigned. The traffic demand calculating unit 314 also performs calculation by summing traffic demands of terminals included in a region of each of the base stations, within a traffic range from each of the base stations. The traffic demand calculating unit 314 calculates traffic of the terminals, except from an assigned terminal.

The traffic demand calculating unit 314 calculates traffic, using the following Equation 1:

$$\sigma_i(s) = \min(\Sigma_{u_q \in W_{i(s)}} d_q(s), T_i^{max}) \qquad \text{[Equation 1]}$$

In Equation 1, $\sigma_i(s)$ denotes traffic that is to be provided by a base station Bi at a time s, $W_i(s)$ denotes a set of terminals included in the base station Bi at the time s, $u_q$ denotes a terminal included in the set $W_i(s)$, $d_q(s)$ denotes a traffic demand required by the terminal $u_q$ at the time s, and $T_i^{max}$ denotes maximum traffic that is capable of being transmitted from the base station Bi.

The base station efficiency calculating unit 316 calculates an energy efficiency of each of the base stations to which a terminal is not assigned. The energy efficiency may be verified based upon an amount of power required to transmit 1 bit. As the amount of power required to transmit 1 bit decreases, the energy efficiency increases.

The base station efficiency calculating unit 316 calculates an energy efficiency, using the following Equation 2:

$$\frac{P_i(\sigma_i(s))}{\sigma_i(s)} \qquad \text{[Equation 2]}$$

In Equation 2, Pi( ) denotes a function used to calculate an amount of power to be consumed based on traffic in the base station Bi, and $\sigma_i(s)$ denotes traffic that is to be provided by the base station Bi at the time s.

The base station management unit 318 verifies a base station with an optimum or best energy efficiency, activates the base station, and assigns terminals in a corresponding region to the base station with the optimum or best energy efficiency.

Additionally, the base station management unit 318 may continuously verify a base station with the optimum or best energy efficiency, and assign terminals, in a corresponding region, to the base station with the optimum or best energy efficiency, using the traffic demand calculating unit 314, and the base station efficiency calculating unit 316, until all terminals are assigned.

Furthermore, the base station management unit 318 switches a base station to which a terminal is not assigned to a sleep mode, after all the terminals are assigned.

The control unit 310 controls the overall operation of the central control apparatus 300. Additionally, the control unit 310 performs functions of the traffic demand receiving unit 312, the traffic demand calculating unit 314, the base station efficiency calculating unit 316, and the base station management unit 318. To individually describe the structural configurations, the control unit 310, the traffic demand receiving unit 312, the traffic demand calculating unit 314, the base station efficiency calculating unit 316, and the base station management unit 318 are separately illustrated. In one illustrative example, the control unit 310 may include at least one processor configured to perform a function of each of the traffic demand receiving unit 312, the traffic demand calculating unit 314, the base station efficiency calculating unit 316, and the base station management unit 318. In addition, the control unit 310 may include at least one processor configured to partially perform a function of each of the traffic demand receiving unit 312, the traffic demand calculating unit 314, the base station efficiency calculating unit 316, and the base station management unit 318.

Hereinafter, a method of operating a communication network based on an energy efficiency of a base station in a central control apparatus that is configured as described above will be described with reference to FIG. 4.

FIG. 4 illustrates a flowchart of a method to operate a communication network based on an energy efficiency of a base station in a central control apparatus, in accordance with an embodiment.

Referring to FIG. 4, at operation 410, the method determines whether a base station event is occurring. At operation 412, in response to an occurrence of the base station control event, the method receives a required traffic demand and a current location of each of terminals from each of the terminals through a separate low-power control channel that is communicable with the central control apparatus. The base station control event may occur at a preset time, during a preset time interval, or at a point in time at which the method of the central control apparatus requests each of the terminals to transmit the required traffic demand and the current location.

At operation 414, the method calculates traffic of each of base stations to which a terminal is not assigned. For example, the method at the central control apparatus calculates traffic by summing traffic demands of terminals included in a region of each of the base stations within a traffic range that is provided by each of the base stations. In this example, the method at the central control apparatus calculates the traffic of the terminal, except of an assigned terminal.

At operation 416, the method calculates an energy efficiency of each of the base stations. The energy efficiency may be verified based on an amount of power required to transmit 1 bit. As the amount of power required to transmit 1 bit decreases, the energy efficiency increases.

At operation 418, the method verifies a base station with the optimum or best energy efficiency. At operation 420, the method activates the base station with the optimum or best energy efficiency, and assigns terminals of a corresponding region to the base station with the optimum or best energy efficiency.

At operation 422, the method determines whether all terminals are assigned to a base station.

In response to determining that all of the terminals are not assigned at operation 422, the method reverts to operation 414. The method may repeatedly perform operations 414 to 422.

At operation 422, in response to determining that all of the terminals are assigned, at operation 424, the method switches to a sleep mode a base station to which a terminal is not assigned despite all of the terminals being assigned.

It is to be understood that in the embodiment of the present invention, the operations in FIG. 4 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 4.

Program instructions to perform a method described in FIG. 4, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The units and apparatuses described herein may be implemented using hardware components. The hardware components may include, for example, controllers, sensors, processors, generators, receivers, memory, managers, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A central control apparatus, comprising:
a traffic demand receiving processor configured to receive a required traffic demand and a current location of each of terminals;
a traffic demand calculating processor configured to calculate traffic of each of base stations to which a terminal is unassigned;
a base station efficiency calculating processor configured to calculate an energy efficiency of each of the base stations; and
a base station management processor configured to verify a base station with an optimal energy efficiency, to activate the base station with the highest energy efficiency, assign terminals in a descending order of energy efficiencies, and to assign the terminals of a corresponding region to the base station with the highest energy efficiency, to reduce power by stopping an operation of a base station not used during a low-traffic time slot, wherein the energy efficiency is verified based on an amount of power required to transmit 1 bit, and wherein, as the amount of power required to transmit 1 bit decreases, the energy efficiency increases.

2. The central control apparatus of claim 1, wherein the traffic demand calculating processor, the base station efficiency calculating processor, and the base station management processor repeatedly receive, calculate the traffic, calculate the energy efficiency, and verify, respectively, until all terminals are assigned to a base station.

3. The central control apparatus of claim 1, wherein the base station management processor switches to a sleep mode a base station to which the terminal is unassigned after all the terminals are assigned to the base station.

4. The central control apparatus of claim 1, wherein the traffic demand receiving processor is configured to receive the required traffic demand and the current location through a separate low-power control channel that is communicable with the central control apparatus.

5. The central control apparatus of claim 1, wherein the traffic demand receiving processor is configured to receive at a preset time, at a preset time interval, or at a point in time at which the central control apparatus requests each of the terminals to transmit the required traffic demand and the current location.

6. The central control apparatus of claim 1, wherein the traffic demand calculating processor is configured to calculate by summing traffic demands of the terminals included in a region of each of the base stations within a traffic range provided by each of the base stations.

7. The central control apparatus of claim 1, wherein the traffic demand calculating processor performs calculation, using the following equation $$\sigma_i(s) = \min(\Sigma_{u_q \in W_i(s)} d_q(s), T_i^{max}),$$

where $\sigma_i(s)$ is traffic that is to be provided by a base station Bi at a time s, $W_i(s)$ is a set of terminals included in the base station Bi at the time s, $u_q$ is a terminal included in the set $W_i(s)$, $d_q(s)$ is a traffic demand required by the terminal $u_q$ at the time s, and $T_i^{max}$ is maximum traffic that is capable of being transmitted by the base station Bi.

8. The central control apparatus of claim 1, wherein the traffic demand calculating processor calculates the traffic, except of an assigned terminal.

9. The central control apparatus of claim 1, wherein the base station efficiency calculating processor performs calculation, using the following equation $$\frac{P_i(\sigma_i(s))}{\sigma_i(s)},$$

where Pi( ) is a function used to calculate an amount of power to be consumed based on traffic in a base station Bi, and $\sigma_i(s)$ is traffic that is to be provided by the base station Bi at a time s.

10. A method of a central control apparatus, the method comprising:
receiving a required traffic demand and a current location of each of terminals;
calculating traffic of each of base stations to which a terminal is unassigned;
calculating an energy efficiency of each of the base stations;
verifying a base station with an optimal energy efficiency;
activating the base station with the optimal energy efficiency;
assigning terminals in a descending order of energy efficiencies; and
assigning the terminals of a corresponding region to the base station with the optimal energy efficiency, to reduce power by stopping an operation of a base station not used during a low-traffic time slot, wherein the energy efficiency is verified based on an amount of power required to transmit 1 bit, and
wherein, as the amount of power required to transmit 1 bit decreases, the energy efficiency increases.

11. The method of claim 10, further comprising:
repeatedly performing the calculating of the traffic, the calculating of the energy efficiency, the verifying, the activating and the assigning until all terminals are assigned to a base station.

12. The method of claim 10, further comprising:
switching to a sleep mode a base station to which the terminal is unassigned after all the terminals are assigned to the base station.

13. The method of claim 10, wherein the receiving comprises receiving the required traffic demand and the current location through a separate low-power control channel that is communicable with the central control apparatus.

14. The method of claim 10, wherein the receiving comprises receiving at a preset time, at a preset time interval, or at a point in time at which the central control apparatus requests each of the terminals to transmit the required traffic demand and the current location.

15. The method of claim 10, wherein the calculating comprises summing traffic demands of the terminals included in a region of each of the base stations within a traffic range provided by each of the base stations.

16. The method of claim 10, wherein the calculating of the traffic comprises performing calculation, using the following equation $$\sigma_i(s) = \min(\Sigma_{u_q \in W_i(s)} d_q(s), T_i^{max}),$$

where $\sigma_i(s)$ is traffic that is to be provided by a base station Bi at a time s, $W_i(s)$ is a set of terminals included in the base station Bi at the time s, $u_q$ is a terminal included in the set $W_i(s)$, $d_q(s)$ is a traffic demand required by the terminal $u_q$ at the time s, and $T_i^{max}$ is maximum traffic that is capable of being transmitted by the base station Bi.

17. The method of claim 10, wherein the calculating of the traffic comprises calculating traffic, except of an assigned terminal.

18. The method of claim 10, wherein the calculating of the energy efficiency comprises performing calculation, using the following equation $$\frac{P_i(\sigma_i(s))}{\sigma_i(s)},$$

where Pi( ) is a function used to calculate an amount of power to be consumed based on traffic in a base station Bi, and $\sigma_i(\ )$ is traffic that is to be provided by the base station Bi at a time s.

19. A non-transitory computer readable medium configured to control a processor to perform the method of claim 10.

* * * * *